US008870209B2

(12) United States Patent
Conrad

(10) Patent No.: US 8,870,209 B2
(45) Date of Patent: Oct. 28, 2014

(54) CONNECTOR FOR RELEASABLY ATTACHING A WHEELCHAIR TO A WHEELED CART

(71) Applicant: Steven S. Conrad, Rogers, AR (US)

(72) Inventor: Steven S. Conrad, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 0 days.

(21) Appl. No.: 13/871,865

(22) Filed: Apr. 26, 2013

(65) Prior Publication Data

US 2013/0285351 A1 Oct. 31, 2013

Related U.S. Application Data

(60) Provisional application No. 61/639,693, filed on Apr. 27, 2012.

(51) Int. Cl.
A61G 5/10 (2006.01)
B60D 1/167 (2006.01)

(52) U.S. Cl.
CPC .................................... B60D 1/167 (2013.01)
USPC ................ 280/304.1; 280/250.1; 280/33.992; 280/33.993; 280/33.991; 280/33.996

(58) Field of Classification Search
USPC ........... 280/304.1, 250.1, 33.992, 33.993, 33, 280/991, 33.996
See application file for complete search history.

(56) References Cited

U.S. PATENT DOCUMENTS

| 4,158,428 | A | 6/1979 | Bates |
| 4,257,545 | A | 3/1981 | Rhyan |
| 4,305,601 | A | 12/1981 | Berge |
| 4,403,786 | A | 9/1983 | Ulics |
| 4,484,755 | A | 11/1984 | Houston |
| 4,555,124 | A | 11/1985 | Millington |
| 4,611,819 | A * | 9/1986 | Glasford ..................... 280/304.1 |
| 5,356,059 | A | 10/1994 | Yanez et al. |
| 5,651,558 | A | 7/1997 | Boyce |
| 5,813,582 | A | 9/1998 | Wright |
| 6,390,426 | B1 | 5/2002 | Berry |
| 6,702,313 | B2 * | 3/2004 | Forshee et al. ............. 280/304.1 |
| 7,152,834 | B2 | 12/2006 | Hsu |
| 7,494,135 | B2 | 2/2009 | Ash et al. |
| 7,500,689 | B2 | 3/2009 | Pasternak et al. |
| 7,647,873 | B1 | 1/2010 | Elflein |
| 7,717,450 | B2 | 5/2010 | Amiri |
| 7,850,188 | B2 | 12/2010 | Suddaby et al. |
| 7,850,189 | B2 | 12/2010 | Barber et al. |
| 7,871,088 | B2 | 1/2011 | Silva et al. |
| 7,926,834 | B2 | 4/2011 | Willis |
| 7,967,174 | B2 | 6/2011 | Lauber |
| 7,980,580 | B2 | 7/2011 | Loewenthal et al. |

* cited by examiner

Primary Examiner — Joseph M Rocca
Assistant Examiner — Marlon Arce
(74) Attorney, Agent, or Firm — Boyd D. Cox

(57) ABSTRACT

A connector for releasably attaching a vehicle such as a shopping cart to a wheelchair includes a pivoting frame that is mounted for use on the cart by a front attachment device and that can be releasably attached to the wheelchair by the chair's occupant. The frame is pivoted to an in-use position and aligned with the wheelchair for attachment. The frame can also be readily released from attachment to the wheelchair by the chair's occupant.

15 Claims, 6 Drawing Sheets

CONNECTOR FOR RELEASABLY ATTACHING A WHEELCHAIR TO A WHEELED CART

Priority for this application is claimed from U.S. Provisional Application No. 61/639,693 entitled "Connector For Releasably Attaching A Wheelchair To A Wheeled Cart" filed on Apr. 27, 2012

BACKGROUND

The present invention is directed to a connector for releasably attaching a wheeled vehicle such as a shopping cart to a wheelchair. With the connector installed on the cart, the wheelchair occupant can readily attach and detach the connector and cart from the chair while remaining seated.

Shoppers who are confined to a wheelchair and those who need to use a wheelchair for extended shopping trips often require a basket or container to hold selected purchases and other items. Typically, a hand basket or container is held in the lap of the wheelchair shopper as he or she moves throughout the store. This is cumbersome for a wheelchair occupant, making it not only difficult to maneuver the chair, but also difficult to reach for shelved items.

Some businesses furnish wheelchairs for the convenience of their customers. Such a wheelchair is occasionally equipped with a basket for holding items for purchase. Typically the basket is attached to the handles of the wheelchair and extends across the chair's seating area. In some instances the basket is pivotally attached to one handle and can be swung upwardly and out of the way, thereby allowing the shopper to enter and exit the wheelchair. There are drawbacks to these types of devices. The size of the basket is limited due to its location on the wheelchair. Additionally, the basket must be emptied of its contents before the occupant can exit the wheelchair, thereby restricting the user's ability to freely get into and out of the wheelchair. This arrangement also necessitates a shopper abandoning his or her own personal wheelchair to use those provided by the store, certainly an inconvenience for a handicapped individual.

The present invention provides a connector that can be attached to a full sized wheeled cart and that can be readily attached to a wheelchair by the wheelchair occupant. The occupant can readily attach the connector and an attached wheeled cart to his or her wheelchair while remaining seated in their wheelchair. The connector has an offset actuator arm that provides a variable fitting when attaching to a wheelchair. Consequently, the invention is adapted for attachment to different sizes of wheelchairs.

During use, the connector allows for relative vertical movement between the cart and the attached wheelchair, allowing the attached vehicles of the combined assembly to travel smoothly together over uneven surfaces. Additionally, this connector is durable and convenient for wheelchair occupants with various levels of ability to use. It enables a user with minimum, moderate and severe mobility limitations to be able to readily attach and detach a cart from his or her wheelchair without assistance. The invention can provide individuals who temporarily use a wheelchair and individuals who are confined to a wheelchair with a higher level of independence, particularly when they are shopping.

SUMMARY

The present invention is a connector formed by a generally U-shaped frame that can readily attach a wheeled cart to a wheelchair. A wheelchair occupant is able to attach the wheeled cart to their wheelchair without assistance and without leaving their seat in the chair With a wheeled cart attached to a wheelchair by the connector of the present invention, the wheelchair can be easily maneuvered through turns and straightaways and over uneven supporting surfaces.

It is an object of the present invention to provide a means for releasably attaching a wheelchair to a wheeled cart.

It is a further object of the present invention to provide a connector in which a wheelchair occupant can releasably attach a wheeled cart to their wheelchair.

It is a further object of the present invention to provide a quick release connector for attaching a cart to a wheelchair.

It is a further object of the present invention to provide a means for quickly securing a cart to a wheelchair.

It is a further object of the present invention to provide a connector that is convenient for a wheelchair occupant to use to attach a wheeled cart to the wheelchair.

It is a further object of the present invention to provide a connector for releasably attaching a cart to a wheelchair in which the connector is durable, sturdy and long lasting.

It is a further object of the present invention to provide a universal connector that can releasably attach to various sizes and styles of wheelchairs.

It is a further object of the present invention to provide a releasable connector for attaching a towing vehicle to a towed vehicle.

It is a further object of the present invention to provide a releasable connector for attaching two vehicles in which the rear vehicle is powered and the lead vehicle is pushed.

It is a further object of the present invention to provide a connector for releasably coupling two movable objects together.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
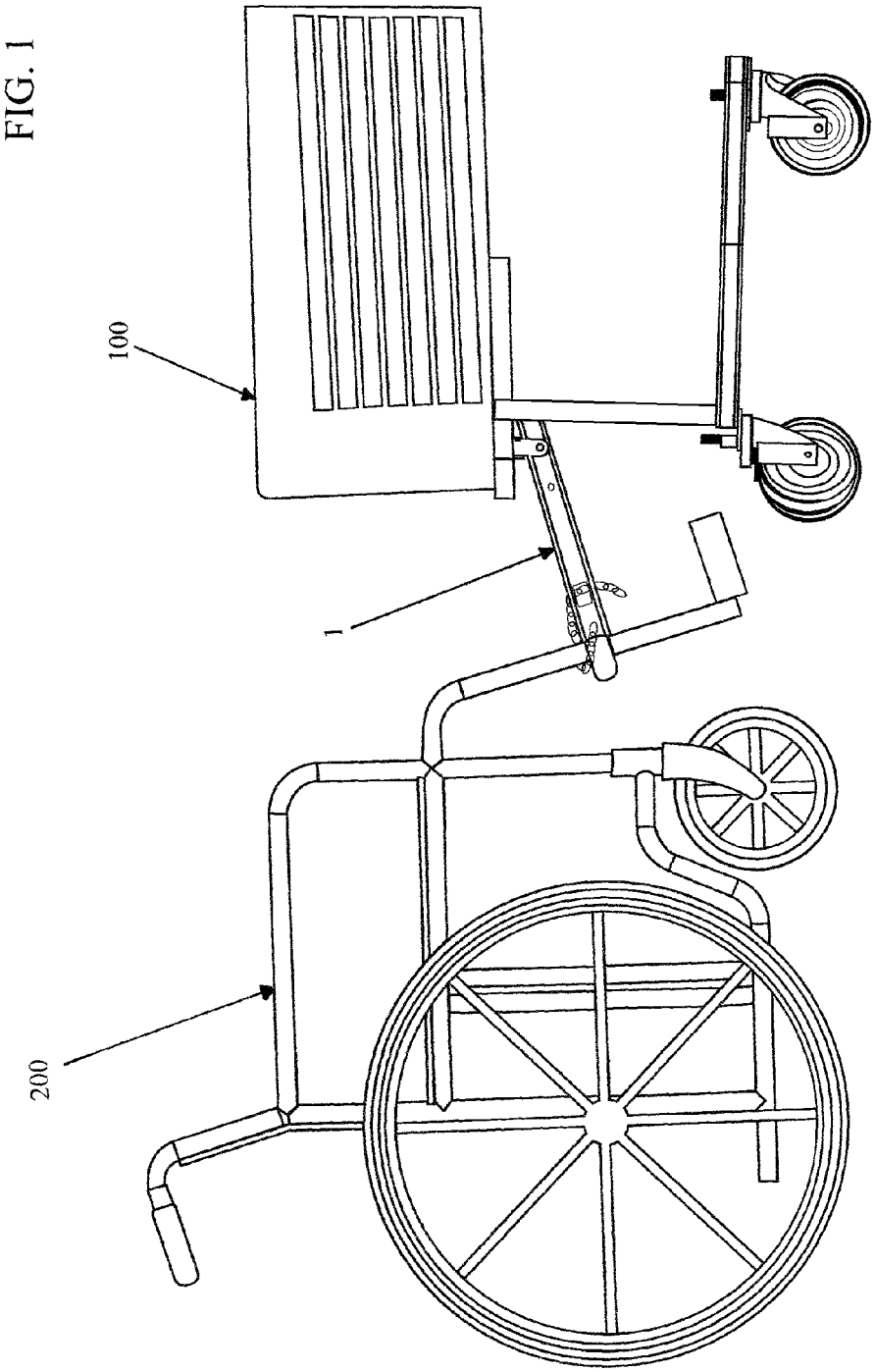
FIG. 1 is a side planar view of a preferred embodiment of the invention shown in combination with a wheeled cart and a wheelchair.
Figure 2:
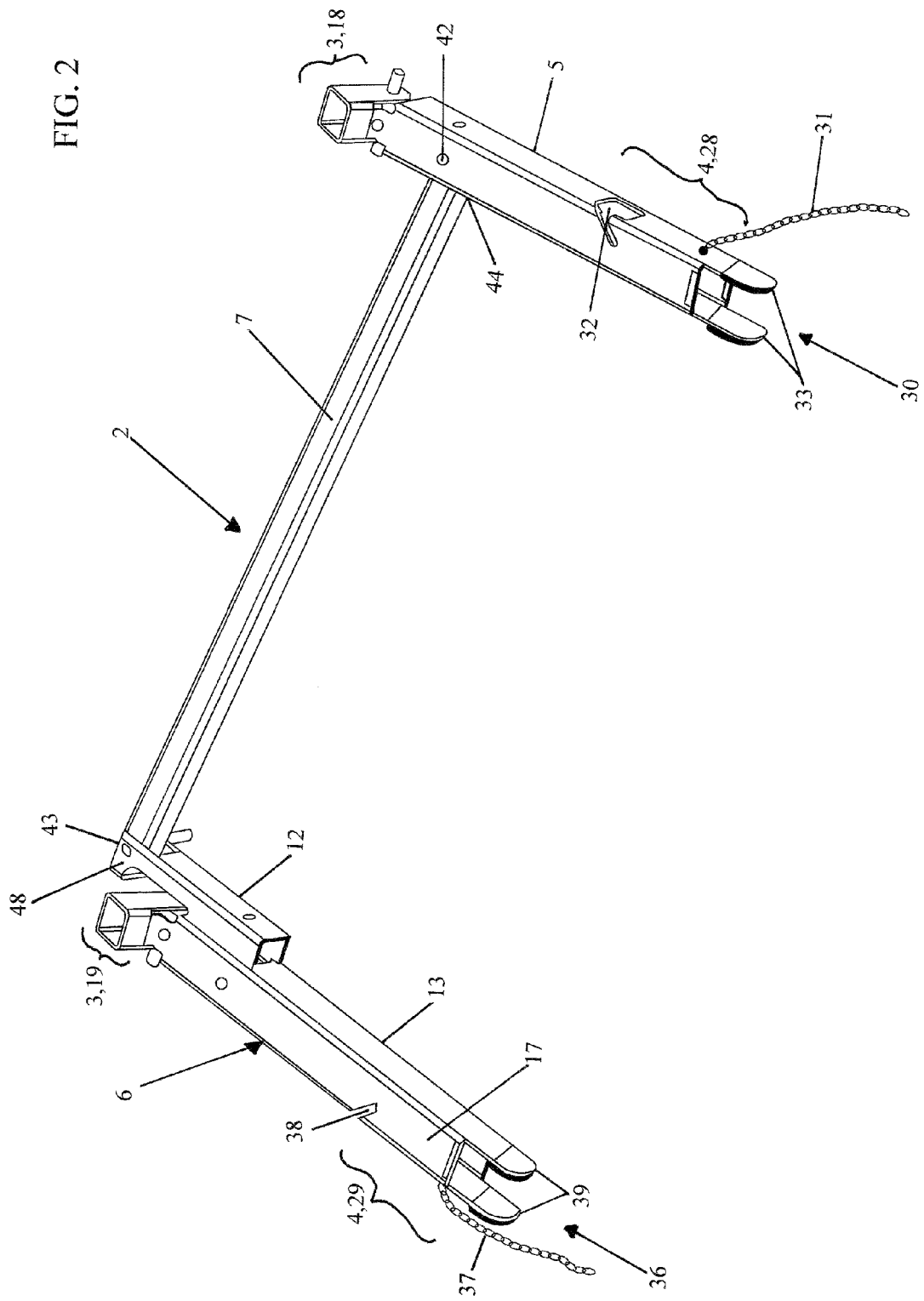
FIG. 2 is a perspective view of the invention shown in FIG. 1.
Figure 3:
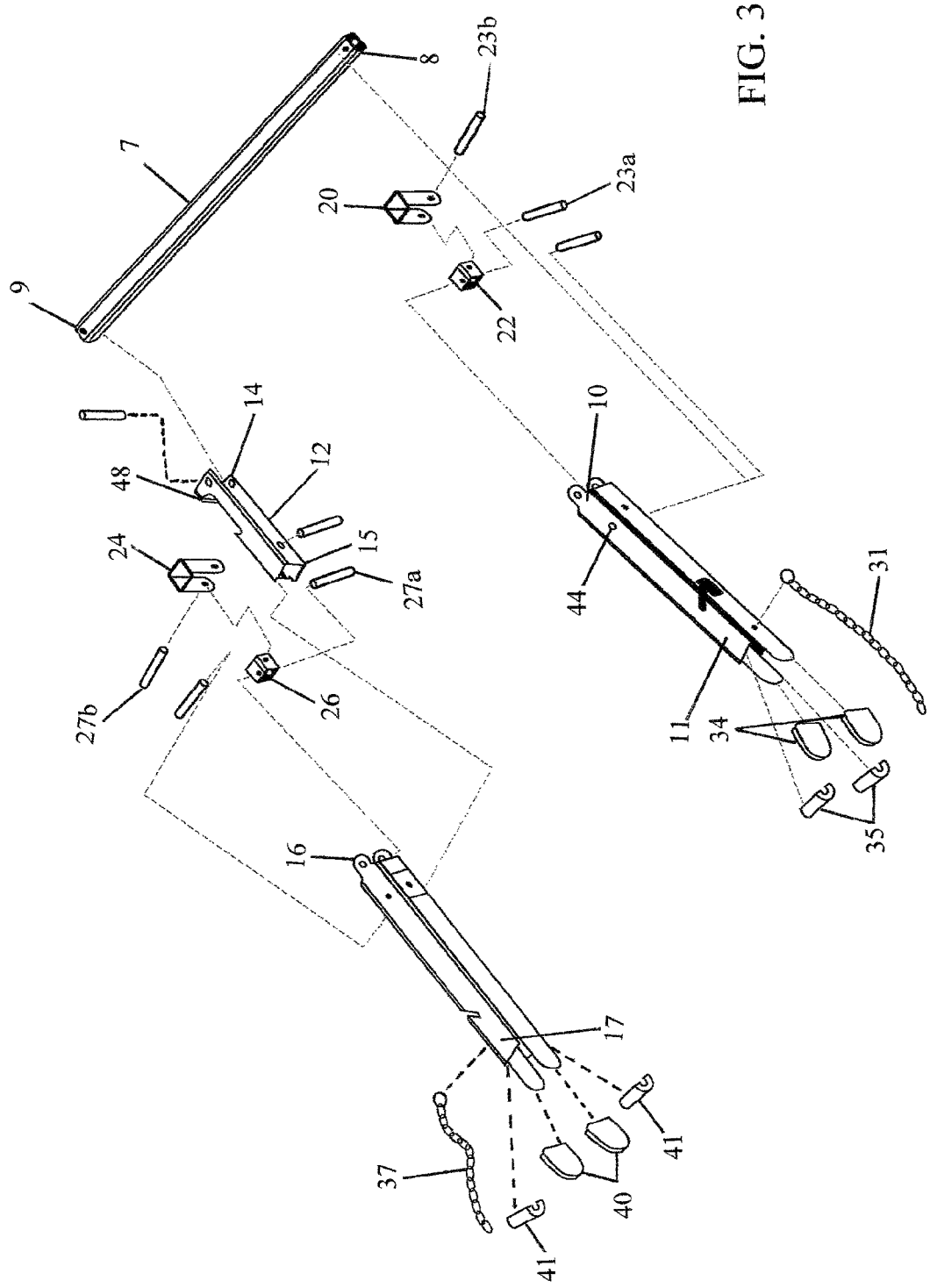
FIG. 3 is an exploded perspective view of the invention shown in FIG. 1.

The connector (1) of a preferred embodiment of the present invention as shown in FIG. 1 is mounted on a wheeled cart (100) for use and can be readily attached to and detached from a wheelchair (200) by the chair's occupant. Referring to FIGS. 2 and 3, the connector (1) includes a frame (2), means for attaching the frame to a cart, and means for releasably attaching the frame to a wheelchair. The means for attaching the frame to a cart is a front attachment device (3). The means for releasable attaching the frame to a wheelchair is a rear attachment device (4).

The frame (2) is defined by first (5) and second (6) arms and an actuator arm (7). The actuator arm (7) has first (8) and second (9) ends. The first arm (5) includes third (10) and fourth (11) ends and an attachment point (44). The second arm (6) has an offset proximal portion (12) and a distal portion (13). The offset proximal portion (12) has fifth (14) and sixth (15) ends, while the distal portion (13) has seventh (16) and eighth (17) ends. A stop limit (48) comprising a protrusion is disposed on the fifth end (14) of the offset proximal portion (12) of the second arm (6). The frame (2) also includes right (42) and left (43) pivotal arm joints.

The front attachment device (3) comprises first (18) and second (19) brackets adapted to attach to the wheeled cart (100). The first bracket (18) includes a first yoke (20), a first pivoting piece (22) and first (23a) and third (23b) pivot pins. Similarly, the second bracket (19) has a second yoke (24), a second pivoting piece (26) and second (27a) and fourth (27b) pivot pins.

The rear attachment device (4) includes first (28) and second (29) vehicle attaching assemblies. The first vehicle attaching assembly (28) is disposed on the first arm (5) and comprises a first fork (30), a first chain (31) and a first notch (32). The first fork (30) has two prongs (33) and each prong (33) has a protective cover (34). In addition, cushioning pads (35) are disposed between the prongs (33).

Similarly, the second vehicle attaching assembly (29) is on the second arm (6) and has a second fork (36), a second chain (37) and a second notch (38). The second fork (36) includes two prongs (39) and each prong has a protective cover (40). A pair of cushioning pads (41) are disposed between the prongs (39).

The arms (5,6,7) of the frame (2) are constructed of elongated, generally tubular pieces with each piece having a generally square cross sectional shape and being preferably made of steel. However, other suitable materials having similar strength and durability could be substituted therefore. In one preferred embodiment, the cushioning pads (35,41) and protective covers (34,40) on the vehicle attaching assemblies (28,29) are made of a soft polymer, but could be made of any suitable type of material, including nylon, other plastics or rubber.

The connector (1) attaches a wheelchair (200) to a wheeled cart (100), such that an occupant can easily attach and detach the cart from the chair while remaining seated in the wheelchair (200). The frame (2) supports the front attachment device (3) and the rear attachment device (4). The right (42) and left (43) arm joints of the frame (2) pivotally attach the actuator arm (7) to the frame's first (5) and second (6) arms, respectively. The right arm joint (42) is positioned at the first end (8) of the actuator arm (7) and at the attachment point (44) on the first arm (5). The left arm joint (43) is positioned at the second end (9) of the actuator arm (7) and the fifth end (14) of the second arm (6). The actuator arm (7) coordinates movement between the first (5) and second (6) arms which typically occurs when installing the connector (1) on a wheelchair and when the combined assembly is moved during use.

On the front cart attachment device (3), the first (18) and second (19) brackets attach the frame (2) to the wheeled cart (100). Specifically, the first pivoting piece (22) is directly attached to the first arm (5) of the frame (2) by the first pivot pin (23a). The first pivoting piece (22) is attached to the first yoke (20) by the third pivot pin (23b). The third pivot pin (23b) extends generally horizontally through the first pivoting piece (22) and the first yoke (20). The first (23a) and third (23b) pivot pins are disposed at generally right angles to each other.

Similarly, the second pivoting piece (26) is attached to the seventh end (16) on the distal portion (13) of the second arm (6) by the second pivot pin (27a). The second pivoting piece (26) is secured to the second yoke (24) by the fourth pivot pin (27b). The fourth pivot pin (27b) extends generally horizontally through the second pivoting piece (26) and the second arm (6). The third (23b) and fourth (27b) pivot pins are generally aligned axially with each other. The second (27a) and fourth (27b) pivot pins are disposed at generally right angles to each other.

In a preferred embodiment, the yokes (20,24) are affixed to the wheeled cart (100) by welds. However, other suitable means, including rivets or bolts could be used instead.

With the first (23a) and second (27a) pivot pins attaching the respective first (5) and second (6) arms to the respective first (22) and second (26) pivoting pieces and the third (23b) and fourth (27b) pivot pins attaching the respective first (22) and second (26) pivoting pieces to the respective first (20) and second (24) yokes, pivotal movement can occur between the frame (2) and the respective yokes (20,24). With a wheeled cart (100) attached to the connector (1), movement can also be allowed between the frame (2) and the cart (100). The first (5) and second (6) arms can be readily maneuvered up and down and from side to side in order to fit on the wheelchair's frame during installation on a wheelchair, particularly before the vehicle attaching assemblies (28,29) are engaged with the wheelchair (200).

When installed on a wheelchair (200) the connector (1) allows relative vertical movement to occur between the attached wheeled cart (100) and the attached wheelchair (200). With such an allowance for vertical movement between the wheeled cart (100) and the wheelchair (200), the combined assembly can move smoothly over uneven surfaces.

With the actuator arm (7) and the first (22) and second (26) pivoting pieces attached to the respective first (5) and second (6) arms, lateral movement of one of the arms (5,6) in one direction will precipitate movement of the other arm (5,6) in an opposite direction. Therefore, the arms (5,6) will move toward and away from each other simultaneously. Each of the arms (5,6) can pivot from side to side on the respective first (23a) and second (27a) pivot pins. For example, when the first arm (5) is moved in a lateral direction away from the second arm (6), the second arm (6) simultaneously moves in the opposite direction away from the first arm (5). Conversely, when the first (5) arm is moved in a direction toward the second arm (6), that second arm (6) moves toward the first arm (5). The same articulation applies to the first arm (5) when the second arm (6) is moved laterally. When the arms (5,6) are moved laterally toward or away from each other, the fourth end (11) of the first arm (5) moves generally the same distance as the eighth end (17) of the second arm (6).

Figure 6:
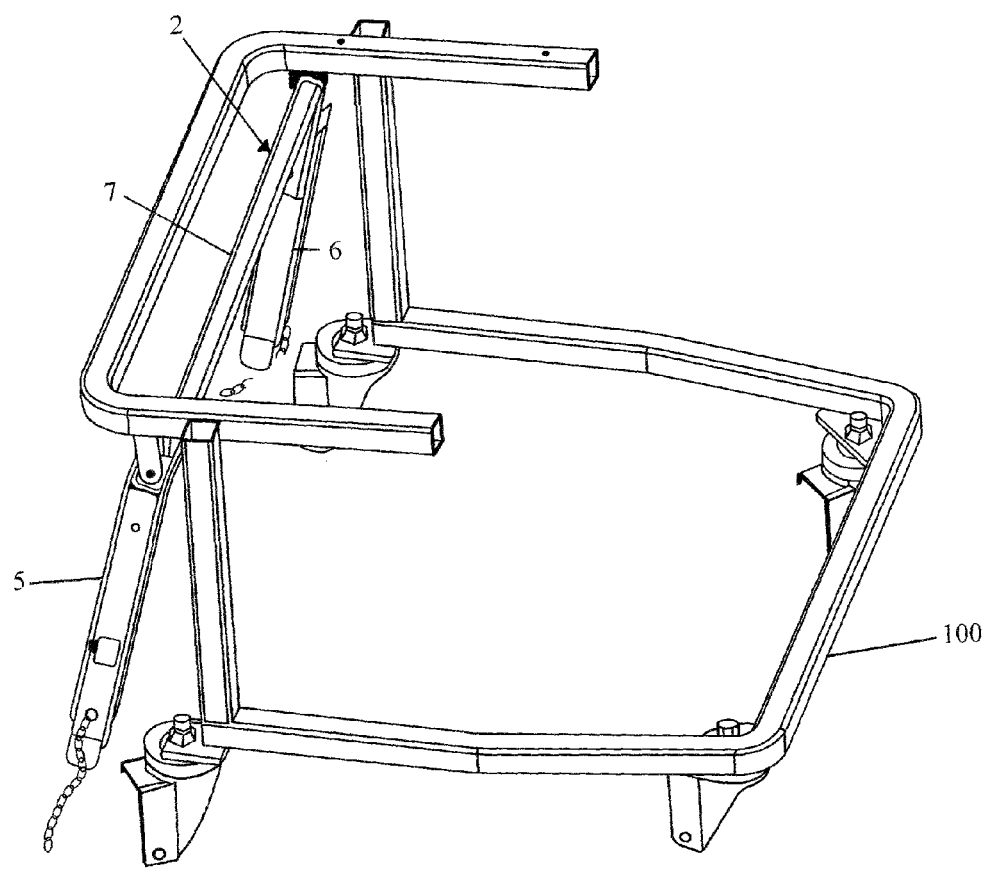
FIG. 6 is a top perspective view of the invention shown in FIG. 1 attached to a wheeled cart frame.

Additionally, the first (5) and second (6) arms pivot about respective third (23b) and fourth (27b) pivot pins disposed horizontally in the respective first (22) and second (26) pivoting pieces. Due to the actuating arm (7), the first (5) and second (6) arms pivot together about the horizontal axis, allowing the frame (2) to swing from a hanging, non-use position as shown in FIG. 6 to an in-use position with the frame (2) extended outwardly from the rear of the cart (100) to connect with a wheelchair (200). Consequently, when either of the first (5) or second (6) arms is swung upwardly, the other arm also swings upwardly generally alongside the arm that is being directly maneuvered.

Each of the vehicle attaching assemblies (28,29) releasably secures a respective first (5) and second (6) arm to the wheelchair (200). With the connector (1) installed on a wheelchair (200), the first vehicle attaching assembly (28) attaches the first arm (5) to one side of the wheelchair (200) and the second chair attaching assembly (29) attaches the second arm (6) to an opposite side of the wheelchair (200). Thus attached, the first (5) and second (6) arms are deterred from further lateral movement.

On the second arm (6), the second bracket (19) secures the second arm (6) to the wheeled cart (100). The offset proximal portion (12) extends beyond the seventh end (16) of the distal portion (13), thereby increasing the effective length of the second arm (6). Since the second bracket (19) is disposed on the seventh end (16), the offset proximal portion (12) also extends forward beyond the second bracket (19).

Each of the protective covers (34, 40) is disposed over at least a portion of the respective prongs (33,39) of the first (30) and second (36) forks in order to minimize damage to an attached wheelchair (200). Similarly, the cushioning pads (35, 41) create a snug fit between the frame of the wheelchair and the arms (5,6) of the connector (1), thereby reducing slippage and attenuating vibrational noise. In addition, the cushioning pads (35,41) protect the wheelchair's frame against frictional damage.

The actuator arm (7) is pivotally connected at its first end (8) to the first arm (5) by the right arm joint (42). The right arm joint (42) is located at the attachment point (44) which is disposed along a length of the first arm (5) between the third (10) and fourth (11) ends and is closer in distance to the third end (10) than the fourth end (11) of the first arm (5). The right arm joint (42) provides for pivotal movement of the first arm (5) about an axis that extends generally parallel to the axis of rotation of the first (23a) and second (27a) pivot pins.

The second end (9) of the actuator arm (7) is pivotally connected to the second arm (6) by the left arm joint (43). Specifically, the left arm joint (43) is disposed on the fifth end (14) of the second arm's proximal portion (13). The left arm joint (43) provides for pivotal movement about an axis that extends generally parallel to the axis of rotation of the first (23a) and second (27a) pivot pins.

Figure 4:
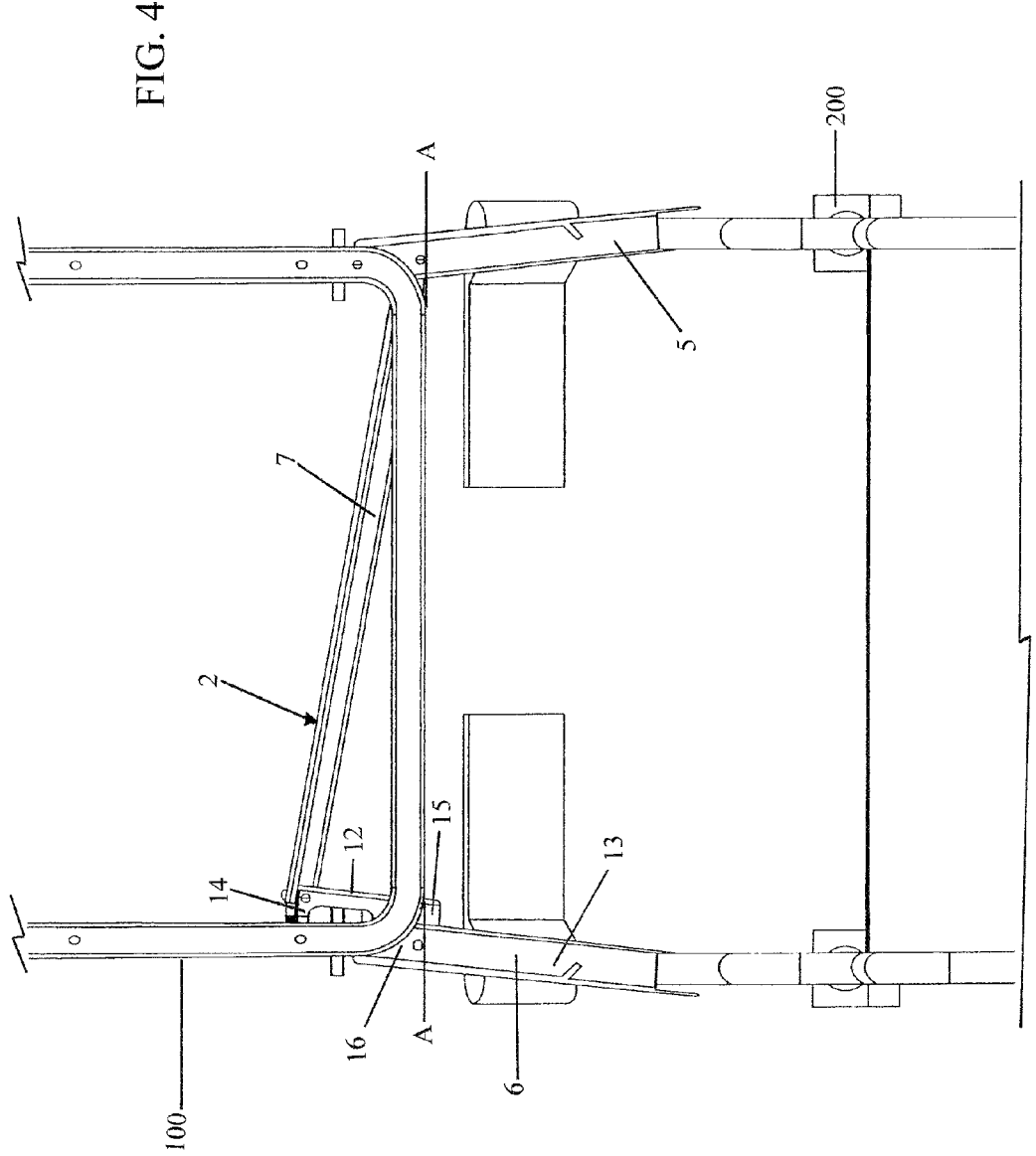
FIG. 4 is a top planar view of the invention of FIG. 1 attached to a wheeled cart frame and a wheel chair.
Figure 5:
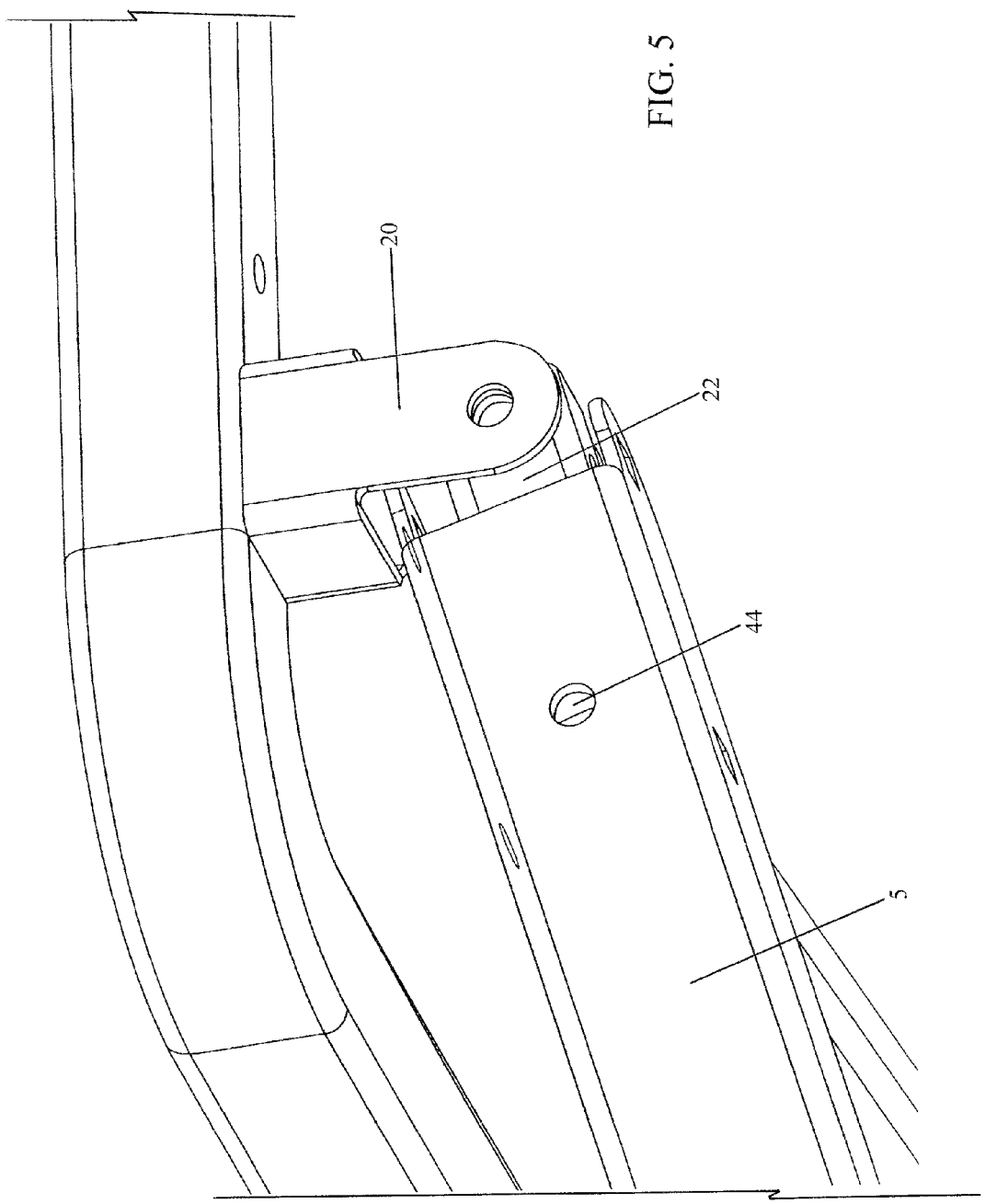
FIG. 5 is a partial perspective view showing the first bracket of the cart attachment device of the invention shown in FIG. 1 secured to a wheeled cart.

When the front attachment device (3) is attached to a wheeled cart (100), the first (8) and second (9) ends of the actuator arm (7) are horizontally offset from each other as shown in FIG. 4. Line A-A extending through an axis containing the third (23b) and fourth (27b) pivot pins remains non-parallel to the actuator arm (7) as the first (5) and second (6) arms are moved laterally. Furthermore, an included angle formed between the actuator arm (7) and the first arm (5) is not equal in magnitude to the included angle formed between the actuator arm (7) and the second arm (6). The included angle between the first arm (5) and the actuator arm (7) remains larger in magnitude than the included angle formed between the second arm (6) and the actuator arm (7) as the first (5) and second (6) arms move from side to side. The disposition of the actuator arm (7) facilitates maneuvering of the first (5) and second (6) arms and their respective vehicle attaching assemblies (28,29) into position for attachment to the wheelchair (200).

In a preferred embodiment of the connector (1), the first bracket (18) is pivotally attached to the first arm (5). The first arm's third end (10) is attached to the first pivoting piece (22) by the first pivot pin (23a). The first yoke (20) is attached to the first pivoting piece (22) by the third pivot pin (23b).

The second bracket (19) is pivotally attached to the second arm (6). The second arm's seventh end (16) is attached to the second pivoting piece (26) by the second pivot pin (27a). The second yoke (24) is attached to the second pivoting piece (26) by the fourth pivot pin (27b).

When the connector (1) is attached to a cart (100), the front attachment device (3) is engaged with a frame of the cart (100). The frame (2) of the connector (1) can pivot about a horizontal axis that is generally aligned with the axes of the third (23b) and fourth (27b) pivot pins. Consequently, the frame (2) can be pivoted between the non-use position or a vertical disposition (FIG. 6) and the in-use position or an extended disposition (FIG. 1) on the cart (100). Furthermore, the first (5) and second (6) arms can be moved laterally, pivoting about the respective third (23b) and fourth (27b) pivot pins.

However, when the connector (1) is further attached to a wheelchair (200), lateral movement of the first (5) and second (6) arms is deterred. The frame (2) is allowed to pivot about the horizontal axis that is aligned with the third (23b) and fourth (27b) pivot pins, thereby allowing relative vertical movement between the cart (100) and the frame (2) and allowing relative vertical movement between the cart (100) and the wheelchair (100).

Regarding the second arm (6), the offset proximal portion (12) is attached to the distal portion (13). Specifically, the sixth end (15) of the former is secured adjacent to the seventh end (16) of the latter and is disposed between the seventh (16) and eighth (17) ends to form the second arm (6). The offset proximal portion (12) of the second arm (6) extends beyond the seventh end (16) of the distal portion (13) in a direction that is away from the distal portion (13). The proximal portion (12) is disposed on a side of the distal portion (13) that is closest to the first arm (5).

Referring to FIGS. 3 and 4, the first (28) and second (29) vehicle attaching assemblies are disposed on the respective first (5) and second (6) arms. Specifically, the first vehicle attaching assembly (28) is disposed on the fourth end (11) of the first arm (5) and the second vehicle attaching assembly (29) is disposed on the eighth end (17) of the second arm (6).

On the frame (2), the first arm (5) and distal portion (13) of the second arm (6) are approximately the same magnitude in length. With the offset proximal portion (12) attached to the distal portion (13), the total length of the second arm (6) is greater than the length of the first arm (5).

On the second arm (6) of the frame (2), the offset proximal portion (12) of the second arm (6) is longitudinally offset from the distal portion (13) of the second arm (6), as shown in FIGS. 3 and 4. Consequently, the fifth (14) and sixth (15) ends are also offset from the seventh end (16) along the length of the second arm (6).

Each pair of prongs (33, 39) on the respective first (30) and second (36) forks is sheathed with a protective cover (34,40). The cushioning pads (35,41) of the first (28) and second (29) vehicle attaching assemblies are disposed on the end of each first (5) and second (6) arm and are disposed between the respective prongs (33,39).

For use, the connector (1) is secured to a wheeled cart (100) by the means for attaching the connector to a wheeled cart (100) such that the first bracket (18) is secured to one side of the wheeled cart (100) and the second bracket (19) is secured to the other side of the wheeled cart (100). When mounted on the wheeled cart (100), the connector (1) is ready for attachment and use with a wheelchair (200). However, as shown in FIG. 6, when not attached to a wheelchair (200), the connector (1) can hang freely in a generally vertical disposition from the wheeled cart (100). Additionally, the frame (2) is free to pivot up and down, while the first (5) and second (6) arms are free to move laterally.

The stop limit (48) can be engaged with a vertical frame member of the wheeled cart (100) in order to hold the arms (5,6) of the connector (1) in a disposition extending slightly away from the cart (100) and towards a user seated in an aligned wheelchair (200). The stop limit (48) is engaged by lowering the frame (2), while drawing the arms (5,6) toward each other until the stop limit (48) engages the body of the wheeled cart (100). With the stop limit (48) engaged, it is easier for a user in a wheelchair (200) to grasp the connector (1).

To attach the connector (1) to a wheelchair (200), the wheelchair (200) is positioned behind the wheeled cart (200) with the front of the wheelchair (200) facing toward the rear of the cart (200). The rear of the cart (100) is generally centered with the front of the chair (200) by moving either the cart (100) or the chair (200), or by moving both. The wheelchair's brakes can be set after centering the chair and cart to ensure non-movement of the chair (200).

When the chair (200) and cart (100) are centered as much as possible, the first (5) and second (6) arms of the connector (1) are brought into a general alignment with respective right and left vertical support posts of the chair's frame. Either one or both of the first (5) and second (6) arms can be directly maneuvered toward the vertical posts of the wheelchair's frame. Since the first (5) and second (6) arms track each other, if one arm (5,6) is maneuvered upwardly, the other arm (5,6) pivots upwardly with the one arm that is swung upwardly.

As the arms are pivoted upwardly, one or both of the aims (5,6) are moved laterally into proximity with the respective vertical post of the wheelchair to which it will be attached. In the event that one arm is moved laterally into its position on the wheelchair, the other arm automatically moves into a proximate position adjacent a respective vertical post on the wheelchair. Since the outer ends of the first (5) and second (6) arms move laterally at approximately the same distance and the cart (100) and wheelchair (200) are generally centered with each other, the vehicle attaching assemblies (28,29) move into the appropriate position to engage the wheelchair's frame. Either of the first (5) or second (6) arms or both of those arms (5,6) can be used for directly manipulating the frame (2) into an engagement position on the wheelchair.

The prongs (33,39) of one of the first (30) or second (36) forks are then engaged with a respective aligned vertical post of the wheelchair frame. The prongs (33,39) of the other of the first (30) or second (36) forks are engaged with the other of the respective aligned vertical posts of the wheelchair's frame. With the forks (30,36) in place on the wheelchair frame, the first (31) and second (37) chains are wrapped around the vertical posts of the wheelchair's frame and under the respective first (30) and second (36) forks. After wrapping the respective first (31) and second (37) chains around the wheelchair's frame, a link of the first chain (31) is slid into the first notch (32) and a link of the second chain (37) is slid into the second notch (38) thereby securing the rear attachment device (4) to the wheelchair (200).

The wheelchair (200) is detached from the wheeled cart (100) by reversing the above steps. The first (31) and second (37) chains are removed from the respective first (32) and second (38) notches. Subsequently, each of the chains (31,37) is unwound from the wheelchair's frame. The wheelchair (200) can then be moved away from the wheeled cart (100) thereby separating the first (30) and second (36) forks from the wheelchair's frame. With the chains (31,37) disengaged from the notches (32,38) and the forks (30,36) removed from the wheelchair's frame, the rear attachment device (4) is disengaged and the wheelchair (200) is separated from the wheeled cart (100).

In a preferred embodiment, the vehicle attaching assemblies (28,29) are shown to attach to vertical posts on the wheelchair's frame as shown in FIGS. 1 and 4. Alternatively, the first (30) and second (36) forks of the respective vehicle attaching assemblies (28,29) could be rotated 90 degrees on the respective first (5) and second (6) aims so that the forks (30,36) could be secured to a horizontally extending member of the wheelchair's frame instead. It is also noted that the forks (30,36) could be configured to attach to other suitable wheelchair structural components.

The connector (1) of the present invention offers wheelchair users more independence to move freely about with a wheeled cart (100). The wheelchair occupant can attach and detach a wheeled cart (100) to and from their chair while remaining seated. With the wheeled cart (100) attached to the wheelchair (200), the frame (2) and the front (3) and rear (4) attachment devices allow an occupant to easily maneuver the combined vehicles.

It can be appreciated that the connector of the present invention is not limited to use with a shopping cart and wheelchair as shown by example herein. The connector can also be used to adjoin various other wheeled vehicles. In addition, the connector can be used to adjoin various non-wheeled vehicles. Non-wheeled vehicles, for example, can include boats, barges, sledges, sleds, pallets or other movable items. Furthermore, the combination of a wheeled and a non-wheeled vehicle can be adjoined by the connector. The vehicles can also be motorized or non-motorized.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A connector for releasably attaching a wheeled vehicle to a wheelchair, the connector comprising:
    a frame;
    a front attachment device for attaching the frame to a wheeled vehicle;
    a rear attachment device for attaching the frame to a wheelchair;
    wherein said frame comprises a first arm, a second arm, and an actuator arm;
    said actuator arm comprises first and second ends;
    said first arm comprises third and fourth ends and an attachment point; wherein said attachment point is positioned along said first arm between the third and fourth ends;
    said second arm comprises an end, an offset proximal portion and a distal portion; wherein said offset proximal portion is longitudinally offset from said distal portion;
    said frame further comprises right and left pivotal arm joints;
    said right pivotal arm joint pivotally attaches the first end of the actuator arm to said attachment point; and
    said left pivotal arm joint pivotally attaches the second end of the actuator arm to the end of the second arm;
    wherein said right and left pivotal arm joints provide pivotal movement of the first and second arms about an axis that is generally perpendicular to a longitudinal axis of the actuator arm; and
    wherein said offset proximal portion includes fifth and sixth ends;
    said distal portion includes seventh and eighth ends; and
    said seventh end is disposed adjacent to said offset proximal portion between said fifth and sixth ends; and said sixth end is disposed adjacent to said distal portion between said seventh and eighth ends of said distal portion.

2. The connector of claim 1, wherein said attachment point is positioned along said first arm at a distance closer to the third end than to the fourth end.

3. The connector of claim 1, wherein said distal portion and said first arm are approximately equal in length.

4. The connector of claim 1, wherein said front attachment device comprises first and second brackets attached to the frame.

5. The connector of claim 1, wherein said first bracket is pivotally attached to the seventh end of the distal portion and said second bracket is pivotally attached to the third end of the first arm.

6. The connector of claim 5, wherein said first bracket comprises a first yoke, a first pivoting piece, a first pivot pin and a third pivot pin; wherein said first pivoting piece is pivotally secured to the third end of the first arm by the first pivot pin, and said first pivoting piece is pivotally attached to the first yoke by the third pivot pin, and said first and third pivot pins extend generally perpendicularly to each other; and
    said second bracket comprises a second yoke, a second pivoting piece, a second pivot pin, and a fourth pivot pin; wherein said second pivoting piece is pivotally attached to the seventh end of the second arm by the second pivot pin, the second pivoting piece is pivotally attached to the second yoke by the fourth pivot pin, and said second and fourth pivot pins extend generally perpendicularly to each other.

7. The connector of claim 5, wherein said first and second arms pivot between a non-use position to an in-use position; wherein in said in-use position, the first and second arms extend generally outwardly and away from the attached wheeled vehicle, and in said non-use position, the first and second arms extend generally downwardly and alongside the attached wheeled vehicle.

8. The connector of claim 5, wherein said rear attachment device includes a first vehicle attaching assembly on the fourth end of the first arm and a second vehicle attaching assembly disposed on the eighth end of the second arm; and
    wherein each of said first and second vehicle attaching assemblies releasably attaches the frame to a wheelchair.

9. The connector of claim 8, wherein said first vehicle attaching assembly comprises a first fork, a first chain attached to the first arm, and a first notch disposed in the first arm; and said first vehicle attaching assembly is adapted to attach said frame to one side of the wheelchair; and
    said second vehicle attaching assembly comprises a second fork, a second chain attached to the second arm, and a second notch disposed on the distal portion of the second arm.

10. The connector of claim 5, wherein when said front attachment device is attached to a wheeled vehicle, an included angle between the actuator arm and the first arm is greater in magnitude than an included angle between the actuator arm and the second arm.

11. A connector for releasably attaching a wheeled cart to a wheelchair, the connector comprising:
    a frame;
    means for releasably attaching the frame to a wheelchair; and
    means for attaching the frame to a wheeled cart;
    wherein said frame is generally U-shaped and comprises a first arm, a second arm, an actuator arm, and right and left pivotal arm joints;
    said actuator arm is pivotally attached to the first and second arms by the right and left pivotal arm joints, respectively;
    said first arm comprises an attachment point located along a length of the first arm; and
    said actuator arm is pivotally attached to the first arm at said attachment point;
    wherein said second arm comprises an offset proximal portion and a distal portion; said offset proximal portion is attached to said actuator arm, and one end of said distal portion is attached to said means for attaching the frame to a wheeled cart;
    wherein said means for attaching the frame to a wheeled cart is further attached to an end of said first arm.

12. The connector of claim 11, wherein said means for releasably attaching the frame to a wheelchair is disposed on an end of said distal portion opposite said means for attaching the frame to a wheeled cart, and said means for releasably attaching the frame to a wheelchair is further disposed on an end of said first arm opposite said means for attaching the frame to a wheeled cart.

13. The connector of claim 12, wherein said distal portion and said first arm are approximately equal in length.

14. A connector for releasably attaching a wheeled cart to a wheelchair, the connector comprising:
    a frame;
    a front attachment device;
    a rear attachment device; and
    a stop limit;
    said frame comprises a first arm, a second arm, and an actuator arm; wherein said actuator arm extends between the first and second arms and further coordinates movement between the first and second arms;
    said actuator arm comprises first and second ends;
    said first arm comprises third and fourth ends and an attachment point; wherein said attachment point is located between the third and fourth ends at a distance closer to the third end than to the fourth end;
    said second arm comprises an offset proximal portion and a distal portion;
    wherein said distal portion and said first arm are approximately equal in length;
    said offset proximal portion includes fifth and sixth ends;
    said distal portion includes seventh and eighth ends;
    wherein said offset proximal portion is longitudinally offset from the distal portion; said seventh end is disposed adjacent to said offset proximal portion and is positioned between said fifth and sixth ends; and said sixth end is disposed adjacent to said distal portion between said seventh and eighth ends of the distal portion;
    wherein said stop limit extends outwardly from said fifth end of said offset proximal portion in a direction away from the actuator arm;
    said frame further comprises right and left arm joints; wherein said right arm joint pivotally attaches the first end of the actuator arm to said attachment point of the first arm; said left arm joint pivotally attaches the second end of the actuator arm to the fifth end of said second arm; and said right and left arm joints provide pivotal movement of the first and second arms about an axis that is generally perpendicular to a length of the actuator arm;
    said front attachment device comprises first and second brackets;
    said first bracket includes a first yoke, a first pivoting piece, a first pivot pin and a third pivot pin;
    wherein said first pivoting piece is pivotally secured to the third end of the first arm by the first pivot pin, said first pivoting piece is pivotally attached to the first yoke by the third pivot pin, and said first and third pivot pins extend generally perpendicularly to each other;
    said second bracket comprises a second yoke, a second pivoting piece, a second pivot pin, and a fourth pivot pin;

wherein said second pivoting piece is pivotally attached to the seventh end on the second arm by the second pivot pin, the second pivoting piece is pivotally attached to the second yoke by the fourth pivot pin, and said second and fourth pivot pins extend generally perpendicularly to each other;

wherein said yokes are adapted for attachment to the cart;

said rear attachment device includes a first vehicle attaching assembly and a second vehicle attaching assembly;

wherein said first and second vehicle attaching assemblies releasably attach the frame to a wheelchair;

said first vehicle attaching assembly comprises a first fork, a first chain and a first notch; wherein said first vehicle attaching assembly is disposed on the fourth end of said first arm, and releasably attaches said frame to one side of the wheelchair;

said first fork comprises two prongs and two protective covers, wherein each of said two protective covers is disposed over a respective one of said two prongs; and said second vehicle attaching assembly includes a second fork, a second chain and a second notch, wherein said second vehicle attaching assembly is disposed on the eighth end of said second arm and releasably attaches said frame to a side of the wheelchair opposite the first vehicle attaching assembly;

said second fork includes two prongs and two protective covers; wherein each of said two protective covers is disposed on a respective one of said two prongs;

wherein said first and second arms pivot respectively about the first and second pivot pins on the front attachment devices, the first and second arms move toward each other simultaneously, the first and second arms move away from each other simultaneously, and said fourth end of the first arm and the eighth end of the second arm move together approximately the same distance;

wherein said first and second arms pivot together about the respective third and fourth pivot pins between a non-use position to an in-use position;

wherein in said in-use position, the first and second arms extend generally outwardly and away from the attached cart, and in said non-use position, the first and second arms extend generally downwardly and alongside the attached cart; and wherein when said front attachment device is attached to a cart, an angle formed between the actuator arm and the first arm is greater in magnitude than another angle formed between the actuator arm and the second arm.

15. The connector of claim 14, wherein to attach the connector to a wheelchair, the first and second vehicle attaching assemblies are engaged; wherein to engage the first and second vehicle attaching assemblies to a wheelchair, the wheelchair is generally aligned in tandem with a rear of the cart, the first and second arms are moved upwardly from the non-use position and away from the cart; the first and second arms are moved laterally to position at least one of the first and second vehicle attaching assemblies adjacent to a respective post on the wheelchair's support; the prongs of one of the first or second forks are placed around the respective post; the prongs of the other of the first and second forks are placed around another adjacent post; the first and second chains are wrapped around the respective posts and under the respective first and second forks; the first and second chains are engaged with respective first and second notches to secure the rear attachment device to the wheelchair; and wherein to detach the wheelchair from the connector, the first and second vehicle attaching assemblies are released; wherein to release the first and second vehicle attaching assemblies, said first and second chains are removed from the respective first and second notches; said first and second chains are unwound from the wheelchair frame; and the first and second prongs are disengaged from the wheelchair frame.

\* \* \* \* \*